Aug. 12, 1969     T. A. BUCHHOLD     3,461,218
CRYOGENIC A.C. CABLE
Filed March 31, 1966
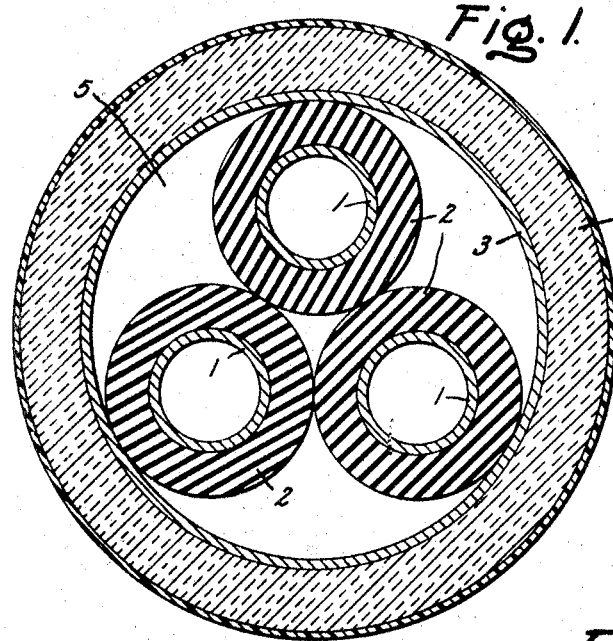
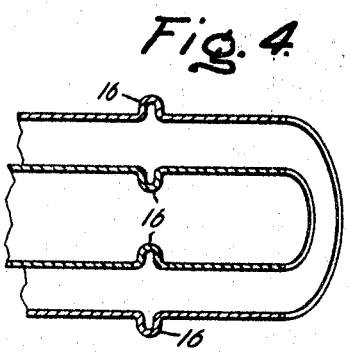
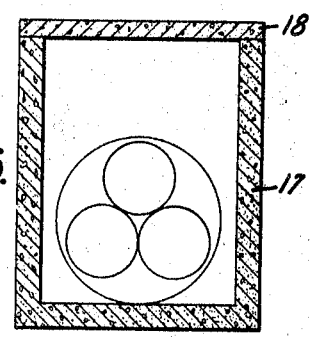
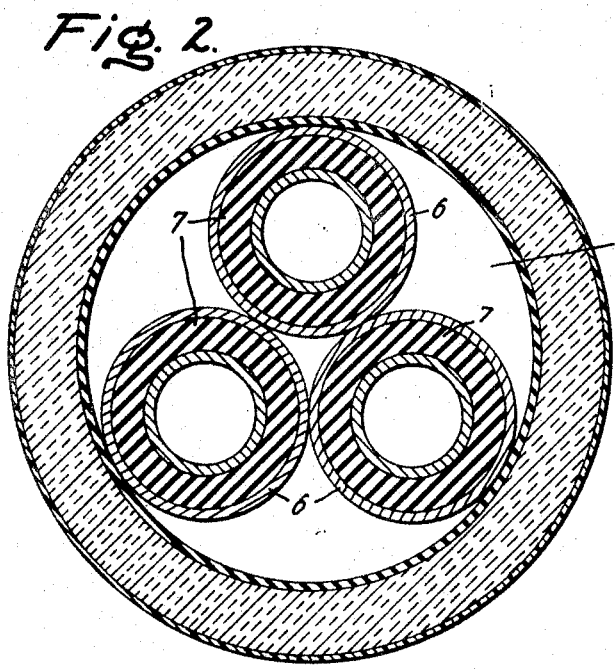
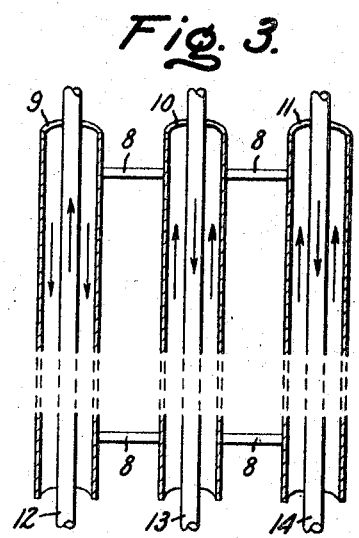
Inventor:
Theodor A. Buchhold,
by *Laurence Mitchell*
His Attorney.

United States Patent Office

3,461,218
Patented Aug. 12, 1969

3,461,218
CRYOGENIC A.C. CABLE
Theodor A. Buchhold, Schenectady, N.Y., assignor to General Electric Company, a corporation of New York
Filed Mar. 31, 1966, Ser. No. 539,089
Int. Cl. H01b 7/34, 9/06
U.S. Cl. 174—15                    3 Claims

ABSTRACT OF THE DISCLOSURE

A cryogenic or superconducting A.C. cable comprises three insulated thin-walled carrying tubes made of high electrical conductivity metal through which cryogenic liquid is pumped, the return flow being through an encasing thermally insulated larger pipe. To reduce losses, each current carrying tube has a surrounding concentric shielding tube in which currents are induced, and the three concentric tubes are connected together electrically to produce a neutral external magnetic field and to center the tubes.

---

My invention relates to an improved electrical cable and in particular to a cable for conducting electricity with a minimum of energy loss, at very low temperatures.

Existing factories and other domestic users are using electrical power at a higher and higher rate. The demands of these customers must be met by the electrical power industry. One method of meeting increased power transmission requirements is to string additional high power cables overhead. Subterranean cables do not require as much equipment above the ground and do not use as much land as overhead power cables. Further, it is more difficult to obtain the right-of-way for overhead lines, especially those of high capacity, because the residents of built-up areas object to the passage of such lines. An alternative is a cable of many times the capacity of overhead lines adapted to be buried in the ground.

The chief object of my invention is to provide a cable for carrying large electric currents under the ground with a minimum power loss.

Another object is to provide a cable having little or no external power loss.

Another object is to provide a cable wherein the electrical conducting elements operate at very low temperatures.

These and other objects will be more readily perceived from my description which follows.

In brief, this invention contemplates the use of a cryogenic liquid such as hydrogen or nitrogen to cool a three conductor cable and to provide increased insulation. The cable has hollow aluminum or copper conductors with optimized cross sections and resistivity. Each conductor comprises two hollow tubes of unequal diameters mounted one within the other on a concentric axis. The three conductors are supported within a sheath of insulation which maintains the low temperature. In this way, the conductors pass electric energy with a minimum of resistance.

Three phase current is passed onto the inner tubes of the three conductors and induces a current on the inside of the outer tubes. The outside tubes are electrically connected to each other at spaced intervals. In this way, there is no magnetic loss exterior to the outer tubes and the current induced in the outer tube tends to center the inner tube. The three outer tubes are electrically bonded to each other and the vector sums of the induced current adds to zero.

The attached drawing illustrates preferred embodiments of the invention in which:

FIGURE 1 shows a cross section view of an insulated cable adapted to pass cryogenic liquid.

FIGURE 2 shows a cross section of an insulated cable in another embodiment of this invention.

FIGURE 3 shows the instantaneous flow of a two or three phase current in the second embodiment of my invention.

FIGURE 4 shows contraction folds in the conductor and pipe.

FIGURE 5 shows a housing for the cable.

It is a well known phenomenon that at low temperatures, many substances lose much of their resistance to the passage of electrical current. Copper and aluminum in the pure state have very little resistance to the passage of electricity or have high electrical conductivity when subjected to temperatures near absolute zero.

When one is working with high purity copper or aluminum cables at low temperature, one finds that for 60 cycles per second the penetration depth of the electricity in high purity aluminum, for example, is on the order of 0.36 millimeter. Thus, a solid aluminum conductor does not utilize the material in the aluminum conductor with any real degree of effectiveness.

One way of obtaining greater utilization of material is to subdivide the material into many tiny or thin wires which must be transposed. To effectively utilize these thin wires, it is necessary that the ohmic and eddy current losses be equal. This requires that each wire diameter have a particular resistivity or resistance ratio. Taking, for example, 15 mil aluminum wires, the optimum resistance ratio is about 150 and a better resistance ratio gave higher losses. Further, a cable of larger cross section built up with thin wires would have a very small fill factor of 10 to 15 percent since such a cable would have a larger diameter, and thus another solution must be sought.

Another type cable to be considered is a tubular type having a wall thickness of about 4 times the penetration depth. In aluminum four times the penetration depth would be, $4 \times 0.36 = 1.5$ millimeters or 60 mils. This type cable would appear to involve a minimum of waste material.

A cable conductive system of the type outlined above is shown in FIGURE 1. In this system, a cryogenic liquid such as, for example, liquid hydrogen or nitrogen is pumped through the hollow tube conductors 1 in one direction. This provides an excellent heat transfer from the aluminum casing to the liquid on the inside. The conductors are surrounded by electrical insulation 2 between them and the outer wall frame 3.

In a closed system the cryogenic fluid must be pumped from one end to the other and returned. To fulfill this condition, hydrogen is pumped forward through the tube 1 and is returned through the spaces between the outer frame 3 and the exterior of the tubes. Further, the liquid hydrogen or nitrogen acts as an electrical insulator of value equal to good insulating oil. The outside of the frame is fully insulated against outside temperature by thermal insulation 4 such as, for example, that shown in patents numbered 2,776,776 issued June 8, 1957, and 3,179,549 issued April 20, 1965, both to Herbert M. Strong et al.

In the embodiment of FIGURE 1, liquid hydrogen is pumped through the center section of the conductors 1 thus keeping them internally cold and is returned over the outside of the conductors through the space 5. The tubes 1 will be near the boiling temperature of liquid hydrogen namely, about 20° Kelvin. At this temperature, the resistance of the tubes will be quite small and large amounts of current are passed through the tubes with a minimum of heat loss.

An improvement of this method of electrical conduction is shown in FIGURES 2 and 3. In these figures, each of the pipes of FIGURE 1 is surrounded by a conductive pipe 6 of the same material. A layer of electrical insulation 7 separates the inner and outer pipe. The current on the outer surface of the inner pipe 1 will induce an equal and opposite current on the inner surface of the outer pipe 6. In my invention, the outer pipes are electrically connected (8) to each other at the ends or at spaced intervals along the length of the pipes as shown in FIGURE 3. When the outer three pipes 9, 10 and 11 are connected to each other in this way and three phase currents are passed through tubes 12, 13 and 14, equal and opposite currents are induced in the outer tubes 9, 10 and 11. In effect the outer tubes act as a transformer secondary and the vector sums of the induced current on outer tubes 9, 10 and 11 add to zero giving a neutral field external to the outer tubes of the conductors. In this way there are no external power losses.

It is readily appreciated from the above that the losses of the conductors and their surrounding pipes may be higher than the losses of the conductors alone. The advantage of the structure above, compared to that of FIGURE 1, is that since the space outside the pipes is free of magnetic fields there are no outside power losses and no forces between the outer pipes 9, 10 and 11. Further, there will be no additional proximity losses and the induced currents on the inner and outer pipes produce no forces between these composite conductors.

The pressure between tubes 9 and 12, 10 and 13, and 8 and 14 is moderate and equally distributed.

Additionally, the larger pipe 3 of FIGURES 1 and 2 which houses the three cables can be made of any material which is liquid tight and is not required to be made of a conductive material though stainless steel is contemplated as desirable.

At intervals, the pipe will have a fold 16 or corrugation as shown in FIGURE 4. As liquid nitrogen or hydrogen is pumped through the pipes, a contraction of pipes takes place and the folds of pipe will be somewhat straightened out. If the conduit is shut down for repair the folds will reappear as the temperature of the pipes rises from cryogenic to ambient temperatures and the wall material expands with the rise of temperature. Extensive breakage or buckling of the cable and pipes due to wide temperature fluctuation is prevented. The electrical insulation at these areas is spirally wound to allow slippage. In the embodiment represented in FIGURES 2 and 3, the cooling liquid is pumped through the inner tubes in one direction and returned through space 15.

My cable is housed in a long channel 17 made of cement or some similar material (FIGURE 5). A lid 18 closes the top of the channel. The cable resting within the channel is free from the effects of direct soil conduction of heat to the cable since the surrounding soil does not touch the cable. The cable is free from the effects of water and dissolved chemicals which are in the soil and thus the life of the cable will be prolonged.

When repair work is necessary the cable is easily accessible within the channel 17. The channel and lid may be buried in the earth or exposed according to the circumstances.

Throughout this specification the invention is referred to as a low temperature device. However, the scope of this invention is intended to include cryogenic or superconductive temperatures.

The same principle can be applied to other coaxial cables.

Having described several embodiments of the improved low temperature cable constructed in accordance with the invention, it is believed obvious that many modifications and variations of the present invention are possible in light of the above teachings. Therefore, it is to be understood that changes may be made in the particular embodiments of the invention described which are within the full intended scope of the invention as defined by the appended claims.

What I claim as new and desire to secure by Letters Patent of the United States is:

1. A cryogenic A.C. cable comprising
   a plurality of hollow alternating current carrying tubes each made of a high electrical conductivity metal,
   a larger pipe encasing said current carrying tubes,
   a cryogenic liquid substantially filling the interior of each of said current carrying tubes and the spaces between the larger pipe and the current carrying tubes,
   concentric tubes made of a high electrical conductivity metal one each surrounding and insulated from each respective current carrying tube and inductively coupled therewith, and
   conductive means for connecting together said concentric tubes at a plurality of spaced intervals so that currents induced on the insides of the concentric tubes add vectorially to zero,
   whereby there is a neutral magnetic field exterior to the tubes and the induction loss of the cable is reduced.

2. A construction as defined in claim 1 wherein there are three current carrying tubes each having a surrounding concentric tube for connection in a three-phase circuit, and further including
   thermal insulation surrounding said larger pipe for shielding said cryogenic liquid from the outside temperature.

3. A construction as defined in claim wherein said high electrical conductivity metal is selected from the group consisting of high purity copper and aluminum, and
   said cryogenic liquid is liquid hydrogen.

References Cited

UNITED STATES PATENTS

| | | | |
|---|---|---|---|
| 2,173,717 | 9/1939 | Hobart | 174—28 |
| 2,740,095 | 3/1956 | Somes | 333—96 |
| 3,162,716 | 12/1964 | Silver | 174—15 |
| 3,292,016 | 12/1966 | Kafka | 307—90 |
| 3,323,089 | 5/1967 | Swartz | 335—216 |

LEWIS H. MYERS, Primary Examiner

A. T. GRIMLEY, Assistant Examiner

OTHER REFERENCES

German printed application, Bruckner et al. 1,133,447, July 1962.

U.S. Cl. X.R.

174—32; 307—90